United States Patent
Van Egmond et al.

(10) Patent No.: US 11,421,055 B2
(45) Date of Patent: Aug. 23, 2022

(54) PROCESS FOR PRODUCING PROPYLENE COPOLYMERS WITH LOW VOC CONTENT

(71) Applicant: W.R. Grace & Co.-Conn, Columbia, MD (US)

(72) Inventors: Jan W. Van Egmond, Charleston, WV (US); John K. Kaarto, Missouri City, TX (US)

(73) Assignee: W.R. GRACE & CO.-CONN, Columbia, MD (US)

( * ) Notice: Subject to any disclaimer, the term of this patent is extended or adjusted under 35 U.S.C. 154(b) by 128 days.

(21) Appl. No.: 16/490,167

(22) PCT Filed: Apr. 10, 2018

(86) PCT No.: PCT/US2018/026811
§ 371 (c)(1),
(2) Date: Aug. 30, 2019

(87) PCT Pub. No.: WO2018/191212
PCT Pub. Date: Oct. 18, 2018

(65) Prior Publication Data
US 2020/0071435 A1    Mar. 5, 2020

Related U.S. Application Data

(60) Provisional application No. 62/484,548, filed on Apr. 12, 2017.

(51) Int. Cl.
*C08F 210/06* (2006.01)
*C08F 2/34* (2006.01)
(Continued)

(52) U.S. Cl.
CPC .............. *C08F 210/06* (2013.01); *C08F 2/34* (2013.01); *C08F 4/642* (2013.01); *C08F 4/646* (2013.01); *C08F 4/6494* (2013.01)

(58) Field of Classification Search
CPC .......... C08F 210/06; C08F 2/34; C08F 4/642; C08F 4/646; C08F 4/6494
See application file for complete search history.

(56) References Cited

U.S. PATENT DOCUMENTS

| 9,663,647 | B2 | 5/2017 | Van Egmond et al. |
| 2010/0168342 | A1 | 7/2010 | Sheard et al. |
| | | (Continued) | |

FOREIGN PATENT DOCUMENTS

| CN | 1533407 A | 9/2004 |
| CN | 105960416 A | 9/2016 |
| | (Continued) | |

OTHER PUBLICATIONS

PCT/US/18/26811 International Search Report and Written Opinion, dated Jul. 2, 2018.
(Continued)

*Primary Examiner* — Catherine S Branch
(74) *Attorney, Agent, or Firm* — Foley & Lardner LLP (57) ABSTRACT

A process comprising polymerizing propylene and an olefin comonomer selected from $C_2$ or $C_4$-$C_8$ with a Ziegler Natta catalyst system and hydrogen in a single gas-phase reactor, to form a propylene polymer, at a temperature range of from 78 to 92° C. with a $H_2/C_3$ molar ratio of 0.005 to 0.25, the catalyst system comprising: a solid catalyst component comprising a transition metal compound, a Group 2 metal compound, an internal electron donor comprising a substituted phenylene aromatic di ester; an activity limiting agent; an organo-aluminum compound; and an external electron donor composition comprising at least one silane, wherein if the olefin comonomer is ethylene it is present in the propylene polymer in an amount from 1.0-7.0 wt % based on the total weight of the propylene polymer, and if the olefin comonomer is $C_4$-$C_8$, it is present in an amount from 1.0-15.0 mol % based on the total amount of the propylene polymer.

24 Claims, 3 Drawing Sheets

(51) Int. Cl.
*C08F 4/642* (2006.01)
*C08F 4/646* (2006.01)
*C08F 4/649* (2006.01)

(56) References Cited

U.S. PATENT DOCUMENTS

2010/0197874 A1  8/2010  Sheard et al.
2016/0280812 A1  9/2016  Kaarto et al.
2016/0312018 A1  10/2016  Vestberg et al.

FOREIGN PATENT DOCUMENTS

| EP | 1580207 A1 | 9/2005 | |
|---|---|---|---|
| EP | 2796502 A1 | 10/2014 | |
| WO | WO-2015073855 A1 * | 5/2015 | ............... C08F 8/50 |

OTHER PUBLICATIONS

"Standard Practice for Determination of Volatiles in Polymers by Static Headspace Gas Chromatography", ASTM Standard D 4526-96 [On-line] May 1997 (May 1997), retrieved from the Internet: <http://allaboutmetallurgy.com/wp/wp-content/uploads/2016/12/D-4526-%E2%80%93-96-R01-RDO1MJY_.pdf.,4 pp; see entire document.

European Search Report Corresponding to Application No. 18784294 dated Nov. 25, 2020.

* cited by examiner

PROCESS FOR PRODUCING PROPYLENE COPOLYMERS WITH LOW VOC CONTENT

CROSS REFERENCE TO RELATED APPLICATIONS

This application is the U.S. National Stage entry of International Application Number PCT/US2018/026811 filed under the Patent Cooperation Treaty and having a filing date of Apr. 10, 2018, which claims priority to U.S. Provisional Application No. 62/484,548 having a filing date of Apr. 12, 2017, all of which are hereby incorporated by reference herein in their entirety for all purposes.

FIELD OF THE INVENTION

The invention relates to a process for producing propylene polymers. More particularly, the invention relates to a process for producing propylene random copolymers having a low level of volatile organic compounds.

BACKGROUND OF THE INVENTION

The role of plastics in the daily life of modern consumers is extensive. In particular, propylene polymers find extensive use in such applications as film, injection molding and blow molding. One challenge for the production of propylene polymers, however, is the presence of volatile organic compounds. These are produced as part of the polymer manufacturing process, and at higher levels can potentially affect product quality, the ability to efficiently process the polymer downstream, and environmental controls. Typically, these impurities are difficult or expensive to reduce using conventional means in the final product after initial production.

Efforts have been ongoing to develop improved processes to reduce impurities in the polymer stream by adjusting the polymerization process or catalyst. For example, U.S. Pat. No. 8,106,138 discloses a process for producing an improved random propylene/α-olefin copolymer composition. WO 2013/041470 discloses a process for the preparation of high-purity propylene polymers. U.S. Patent Application Publication No. 2016/0280812 discloses a process for producing propylene-based polymers for fiber applications. Nevertheless, a continuing need exists for processes that reduce polymer impurities. It has unexpectedly been found that by using a particularly designed Ziegler Natta catalyst system, low VOC propylene copolymers can be produced in a single gas phase reactor at high reactor temperatures.

SUMMARY OF THE INVENTION

In one embodiment, the subject matter of the current specification relates to a process comprising polymerizing propylene and at least one olefin comonomer selected from $C_2$ or $C_4$-$C_8$ with a Ziegler Natta catalyst system and hydrogen in a single gas-phase reactor, to form a propylene polymer. The polymerization is conducted in a temperature range of from 78 to 90° C. with a $H_2/C_3$ molar ratio of 0.005 to 025. The Ziegler Natta catalyst system comprises a solid catalyst component comprising a transition metal compound, a Group 2 metal compound and at least one internal electron donor comprising a substituted phenylene aromatic diester; an organo-aluminum compound; an activity limiting agent and an external electron donor composition comprising at least one silane, where if the olefin comonomer is ethylene it is present in an amount from 0.5-7.0 wt % based on the total weight of the propylene polymer, and if the olefin comonomer is $C_4$-$C_8$, it is present in an amount from 1.0-15.0 mol % based on the total amount of the propylene polymer.

In another embodiment, the current specification relates to a process comprising polymerizing propylene and an olefin comonomer selected from $C_2$ or $C_4$-$C_8$ with a Ziegler Natta catalyst system and hydrogen in a single gas-phase reactor, to form a propylene polymer. The polymerization is conducted in a temperature range of from 78 to 90° C. with a $H_2/C_3$ molar ratio of 0.005 to 0.25. The Ziegler Natta catalyst system comprises a solid catalyst component comprising a transition metal compound, a Group 2 metal compound, and an internal electron donor selected from succinates, diethers, phthalates or benzoates; an organo-aluminum compound; an activity limiting agent, and an external electron donor composition comprising at least one silane, wherein if the olefin comonomer is ethylene it is present in an amount from 0.5-7.0 wt % of the olefin comonomer based on the total weight of the propylene polymer, and if the olefin comonomer is $C_4$-$C_8$, it is present in an amount from 1.0-15.0 mol % based on the total amount of the propylene polymer.

BRIEF DESCRIPTION OF THE DRAWINGS

The invention will be more fully understood from the following detailed description, taken in connection with the accompanying drawings, in which.

DETAILED DESCRIPTION OF THE INVENTION

The subject matter of the current specification relates to a process for producing a propylene polymer having low levels of volatile organic compounds in a single gas-phase reactor operating at high temperature ranges using a Ziegler Natta catalyst.

Volatile Organic Compounds

For the purpose of this specification, the term Volatile Organic Compounds (VOC) means $C_{7-18}$ hydrocarbons comprising oligomers of $C_2$ and $C_3$ monomer that are present in the propylene polymers produced in the polymerization process. The VOC is measured on reactor-produced product after purging with nitrogen but prior to the addition of additives. Although the magnitude of VOC materials is believed to be a complex function of catalyst type, monomer and reactor conditions, it has unexpectedly been found that the process of the present subject matter allows production of propylene random copolymers at elevated reactor temperatures having a low level of VOC. Typically, at these higher reactor temperatures, e.g., above about 80° C., propylene polymerization selectivities can shift, resulting in increasingly higher levels of xylene solubles and oligomers. However, in the present process, low levels of component and total VOC, and XS are maintained throughout a range of elevated temperatures; and other product concerns, such as the occurrence of "popcorn" polymer or agglomerates, is reduced.

The total amount of VOC's present in the propylene polymers, measured by the PV-3341 method described below is typically less than 200 ppm, e.g., from 1 to 199 ppm. Preferably, the total VOC is present in the propylene polymer in an amount less than 150 ppm, e.g., from 1 to 149 ppm. More preferably, the total VOC is present in an amount of less than 100 ppm, e.g., from 1 to 99 ppm. The propylene polymers produced by the process of the present subject matter also possess a total VOC content that has been reduced by at least 79% relative to a polymer produced by an identical process except that the reactor temperature is at 60°. The individual components of VOC, i.e., $C_7$'s, $C_8$'s, $C_9$'s, $C_{12}$'s and $C_{15-18}$ is of the polymer produced by the present process are measured by a modified ASTM D4526 method described below. The $C_7$ VOC component is typically present in an amount of less than 5 ppm, e.g., 1.0-4.0 ppm. Preferably, the $C_7$ VOC component is present in an amount of less than 3 ppm, e.g., 1.0-2.0 ppm. The $C_8$ VOC component is typically present in an amount of less than 35 ppm, e.g., 1.0-34.0 ppm. Preferably, the $C_8$ VOC component is present in an amount of less than 15 ppm, e.g., 1.0-14.0 ppm. The $C_9$ VOC component is typically present in an amount of less than 100 ppm, e.g., 1.0-99.0 ppm. Preferably, the $C_9$ VOC component is present in an amount of less than 80 ppm, e.g., 1.0-79.0 ppm. More preferably, the $C_9$ VOC component is present in an amount of less than 65 ppm, e.g., 1.0-64.0 ppm. The $C_{12}$ VOC component is typically present in an amount of less than 230 ppm, e.g., 1.0-229.0 ppm. Preferably, the $C_{12}$ VOC component is present in an amount of less than 210 ppm, e.g., 1.0-209.0 ppm. The $Cu_{15-18}$ component is typically present in an amount of less than 110 ppm, e.g., 1.0 to 109.0 ppm. Preferably, the $C_{15-19}$ component is present in an amount of less than 95 ppm, e.g., 1.0 to 94.0 ppm.

Catalyst Systems

The above polymers are produced in polymerization processes where, as the polymerization reaction proceeds, the polymer forms around the catalyst particles, so that the catalyst particle becomes part of the polymer itself. The catalysts used in the current process are a Ziegler Natta catalyst system comprising:
  a solid catalyst component comprising a transition metal compound, a Group 2 metal compound, and at least one internal electron donor comprising a substituted phenylene aromatic diester;
  an activity limiting agent;
  an organo-aluminum compound; and
  an external electron donor composition, preferably comprising at least one silane, The combination of solid catalyst component, support, and internal electron donor is typically referred to as a pro-catalyst.

The solid catalyst component contains a transition metal compound and a Group 2 metal compound. The transition metal compound may be a solid complex derived from a transition metal compound, for example, titanium-, zirconium-, chromium- or vanadium-hydrocarbyloxides, hydrocarbyls, halides, or mixtures thereof. The transition metal compound has the general formula $TrX_x$ where Tr is the transition metal, X is a halogen or a $C_{1-10}$ hydrocarboxyl or hydrocarbyl group, and x is the number of such X groups in the compound in combination with a Group 2 metal compound. Tr may be a Group 4, 5 or 6 metal. Preferably, Tr is a Group 4 metal, such as titanium. X may be chloride, bromide, $C_{1-4}$ alkoxide or phenoxide, or a mixture thereof. Preferably, X is chloride.

Nonlimiting examples of suitable transition metal compounds that may be used to form the Ziegler-Natta procatalyst composition are $TiCl_4$, $ZrCl_4$, $HfCl_4$, $TiBr_4$, $TiCl_3$, $Ti(OC_2H_5)_3Cl$, $Zr(OC_2H_5)_3Cl$, $Ti(OC_2H_5)_3Br$, $Ti(OC_3H)_2Cl_2$, $Ti(OC_6H_5)_2Cl_2$, $Zr(OC_2H_5)_2Cl_2$, and $Ti(OC_2H_5)Cl_3$. Mixtures of such transition metal compounds may be used as well. No restriction on the number of transition metal compounds is made as long as at least one transition metal compound is present. Preferably, the transition metal compound is a titanium compound.

Nonlimiting examples of suitable Group 2 metal compounds include magnesium halides, dialkoxymagnesiums, alkoxymagnesium halides, magnesium oxyhalides, dialkylmagnesiums, magnesium oxide, magnesium hydroxide, and carboxylates of magnesium. Preferably, the Group 2 metal compound is magnesium dichloride.

The organo-aluminum compound cocatalyst is preferably selected from trimethylaluminum, triethylalutninum (TEAL), triisobutylaluminum, and tri-n-hexylaluminum. More preferably, the organo-aluminum compound is triethyl aluminum. The pro-catalyst, external electron donor and co-catalyst can be combined in the reactor to form the active catalyst, or the pro-catalyst can be pre-polymerized or pre-activated.

The molar ratio of aluminum to titanium is from about 5:1 to about 500:1, or from about 10:1 to about 200:1, or from about 15:1 to about 150:1, or from about 20:1 to about 100:1, or from about 30:1 to about 60:1.

Internal Electron Donor

The present catalyst composition includes an internal electron donor. Preferably, the internal electron donor includes at least one substituted phenylene aromatic diester and optionally an electron donor component selected from succinates, diethers, phthalates, or benzoates. More preferably, the internal electron donor includes at least substituted phenylene aromatic diester and a benzoate. Preferably, the internal electron donor can also contain only the at least one single substituted phenylene aromatic diester. Even more preferably, the internal electron donor is a single substituted phenylene aromatic diester. The substituted phenylene aromatic diester may be a substituted 1,2-phenylene aromatic diester, a substituted 1,3 phenylene aromatic diester, or a substituted 1,4 phenylene aromatic diester.

When the internal electron donor is a substituted 1,2-phenylene aromatic diester, preferably it has the structure (I) below:

wherein $R_1$-$R_{14}$ are the same or different; and at least one of $R_1$-$R_4$ is selected from a substituted hydrocarbyl group having 1 to 2.0 carbon atoms, an unsubstituted hydrocarbyl group having 1 to 20 carbon atoms, an alkoxy group having 1 to 20 carbon atoms, a heteroatom, and combinations thereof; or any consecutive R groups in $R_1$-$R_4$ may be linked to form an inter-cyclic or an intra-cyclic structure and each of $R_5$-$R_{14}$ is selected from the group consisting of a hydrogen, substituted hydrocarbyl group having 1 to 20 carbon atoms, an unsubstituted hydrocarbyl group having 1 to 20 carbon atoms, an alkoxy group having 1 to 20 carbon atoms, a heteroatom and combinations thereof; or any consecutive R groups in $R_1$-$R_4$ may be linked to form an inter-cyclic or an intra-cyclic structure. Preferably, each of the $R_5$-$R_{14}$ is hydrogen.

As used herein, the team "hydrocarbyl" and "hydrocarbon" refer to substituents containing only hydrogen and carbon atoms, including branched or unbranched, saturated or unsaturated, cyclic, polycyclic, fused, or acyclic species, and combinations thereof. Nonlimiting examples of hydrocarbyl groups include alkyl-, cycloalkyl-, alkenyl-, alkadienyl-, cycloalkenyl-, cycloalkadienyl-, aryl-, aralkyl, alkylaryl, and alkynyl-groups.

The terms "substituted hydrocarbyl" and "substituted hydrocarbon" refer to a hydrocarbyl group that is substituted with one or more non-hydrocarbyl substituent groups. A non-limiting example of a non-hydrocarbyl substituent group is a heteroatom. As used herein, a "heteroatom" refers to an atom other than carbon or hydrogen. The heteroatom can be a non-carbon atom from Groups IV, V, VI, and VII of the Periodic Table. Non-limiting examples of heteroatoms include: halogens (F Cl, Br, I), N, O, P, B, S, and Si. A substituted hydrocarbyl group also includes a halohydrocarbyl group and a silicon-containing hydrocarbyl group. As used herein, the term "halohydrocarbyl" group refers to a hydrocarbyl group that is substituted with one or more halogen atoms. The term "silicon-containing hydrocarbyl group" is a hydrocarbyl group that is substituted with one or more silicon atoms. The silicon atom(s) may or may not be in the carbon chain.

Alternately, at least one of is selected from the group consisting of a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof.

Alternately, at least one of $R_1$-$R_4$, at least one of $R_5$-$R_9$, and at least one of $R_{10}$-$R_{14}$ is an unsubstituted hydrocarbyl group having 1 to 20 carbon atoms.

Alternately, each of $R_1$, $R_3$ and $R_4$ is hydrogen and $R_2$ is an unsubstituted hydrocarbyl group having 1 to 20 carbon atoms. More preferably, each of $R_5$-$R_{14}$ is selected from the group consisting of hydrogen, a substituted hydrocarbyl group having 1 to 20 carbon atoms, an unsubstituted hydrocarbyl group having 1 to 20 carbon atoms, an alkoxy group having 1 to 20 carbon atoms, a halogen, and combinations thereof.

Alternately, each of $R_2$, $R_3$ and $R_4$ is hydrogen and $R_1$ is an unsubstituted hydrocarbyl group having 1 to 20 carbon atoms. More preferably, at least one of $R_5$-$R_{14}$ is selected from the group consisting of hydrogen, a substituted hydrocarbyl group having 1 to 20 carbon atoms, an unsubstituted hydrocarbyl group having 1 to 20 carbon atoms, an alkoxy group having 1 to 20 carbon atoms, a halogen, and combinations thereof. Preferably, $R_1$ is a methyl group and each of $R_5$-$R_{14}$ is hydrogen.

Preferably, the inter- or intra-cyclic structure is a $C_5$ or a $C_6$ membered ring.

Alternately, the substituted 1,2-phenylene aromatic diester is selected from the group consisting of 3-methyl-5-tert-butyl-1,2-phenylene dibenzoate; 3,5-diisopropyl-1,2-phenylene dibenzoate; 3,6-dimethyl-1,2-phenylene dibenzoate; 4-t-butyl-1,2-phenylene dibenzoate; 4-methyl,2-phenylene dibenzoate; 12-naphthalene dibenzoate; 2,3-naphthalene dibenzoate; 3-methyl-t-tert-butyl-1,2-phenylene di(4-methylbenzoate); 3-methyl-5-tert-butyl-1,2-phenylene di(2,4,6-trimethylbenzoate); 3-methyl-5-tert-butyl-1,2-phenylene di(4-fluoro benzoate); and 3-methyl-5-tert-butyl-1,2-phenylene di(4-chlorobenzoate).

External Electron Donor

The present catalyst composition includes a mixed external electron donor (MEED) composed of one or more external electron donors (EED) also known as a selectivity control agents (SCA) and one or more activity limiting agents (ALA). As used herein, "external electron donor" is a compound added independent of procatalyst formation and includes at least one functional group that is capable of donating a pair of electrons to a metal atom. The external electron donor may be selected from one or more of the following: a silicon compound, a bidentate compound, an amine, an ether, a carboxylate, a ketone, an amide, a carbamate, a phosphine, a phosphate, a phosphite, a sulfonate, a sulfone, a sulfoxide, and any combination thereof.

When the EED is a silicon compound, it preferably has the general formula (II):

$$SiR_m(OR')_{4-m} \qquad (II)$$

wherein R independently selected from hydrogen or a hydrocarbyl or an amino group, optionally substituted with one or more substituents containing one or more Group 14, 15, 16, or 17 heteroatoms. R contains up to 20 atoms not counting hydrogen and halogen. R' is a $C_{1-20}$ alkyl group, and m is 0, 1, or 2. In an embodiment, R is $C_{6-12}$ aryl, alkylaryl or aralkyl, $C_{3-12}$ cycloallyl, $C_{1-20}$ linear alkyl or alkenyl, $C_{3-12}$ branched alkyl, or $C_{3-12}$ cyclic amino group, R' is $C_{1-4}$ alkyl, and m is 1 or 2.

Nonlimiting examples of suitable silicon compounds for the EED include dialkoxysilanes, trialkoxysilanes, and tetraalkoxysilanes such as dicyclopentyldimethoxysilane, diisopropyldimethoxysilane, bis(perhydroisopinolino)dimethoxysilane, methylcyclohexyldimethoxysilane, tetraethoxysilane, n-propyltrimethoxy silane, n-propyltriethoxysilane, diethylaminotriethoxysilane, bis(trimethylsilylmethyl)dimethoxysilane, and any combination thereof.

The catalyst system also includes an activity limiting agent (ALA). As used herein, an "activity limiting agent" is a material that reduces catalyst activity in a polymerization reactor at polymerization temperatures greater than about 100° C. An ALA inhibits or otherwise prevents polymerization reactor upset, and ensures continuity of the polymerization process. Use of the ALA results in a self-limiting catalyst composition. As used herein, a "self-limiting" catalyst composition is a catalyst composition that demonstrates decreased activity at a temperature greater than about 100° C. In other words, "self-limiting" is the decline of catalyst activity when the reaction temperature rises above 100° C. compared to the catalyst activity under normal polymerization conditions with reaction temperature usually below about 80° C.

Typically, the activity of Ziegler-Matta catalysts increases as the reactor temperature rises. Ziegler-Natta catalysts also typically maintain high activity near the softening point temperature of the polymer produced. The heat generated by the exothermic polymerization reaction may cause polymer particles to form agglomerates and may ultimately lead to disruption of continuity for the polymer production process. The ALA reduces catalyst activity at elevated temperature, thereby preventing reactor upset, reducing (or preventing) particle agglomeration, and ensuring continuity of the polymerization process.

The activity limiting agent may be a carboxylic acid ester, a diether, a poly(alkene glycol), a succinate, a diol ester, and combinations thereof. The carboxylic acid ester can be an aliphatic or aromatic, mono- or poly-carboxylic acid ester. Nonlimiting examples of suitable carboxylic acid esters include benzoates, $C_{1-40}$ alkyl esters of aliphatic $C_{2-40}$ mono-/di-carboxylic acids, $C_{2-40}$ mono-/poly-carboxylate derivatives of $C_{2-100}$ (poly)glycols, $C_{2-100}$ (poly)glycol ethers, and any combination thereof. Further nonlimiting examples of carboxylic acid esters include laurates, myristates, palmitates, stearates, oleates, sebacates, and (poly)(alkylene)glycols, and mixtures thereof. Preferably, the ALA is isopropyl myristate or di-n-butyl sebacate.

The catalyst composition may include any of the foregoing external electron donors in combination with any of the foregoing activity limiting agents. The external electron donor and/or activity limiting agent can be added into the reactor separately. Alternatively, the external electron donor and the activity limiting agent can be mixed together in advance and then added to the catalyst composition and/or into the reactor as a mixture.

Polymerization Process

The polymerization described in the current subject matter is conducted in a single gas-phase reactor, e.g., a fluidized bed gas phase reactor, horizontal or vertical stirred gas phase reactors, or multizone circulating reactors. Preferably, the first reactor is a fluidized bed gas phase reactor.

The polymerization is conducted by reacting hydrogen, propylene and at least one olefin comonomer selected from $C_2$ and $C_{4-8}$ with the Ziegler Natta catalyst system described above at elevated reactor temperatures to produce a propylene-based polymer. The Ziegler Natta catalyst can be introduced into the gas phase reactor by means of a carrier fluid of propylene, nitrogen, propane, isopentane or hexane. The catalyst can also be delivered in a slurry with an FDA-approved mineral oil. In that case, the catalyst slurry is pumped to the reactor via a progressive cavity pump and fed directly to the resin bed approximately three (3) feet from the reactor wall via a small bore stainless steel tube. A rigid carbon steel support tube purged with either fresh monomer or highly purified high pressure nitrogen is utilized to protect the small bore tubing and minimize plugging from resin agglomeration. Large capacity reaction lines may use more than one injection tube/support tube arrangement.

The propylene polymer can be a propylene copolymer (single comonomer) or terpolymer (two comonomers). When the polymer is a terpolymer, preferably, one of the comonomers is ethylene. When the polymer is a copolymer it is preferably a random copolymer. More preferably, the random copolymer is a propylene random copolymer with ethylene. The temperature of the polymerization is from 78 to 90° C. Preferably, the polymerization temperature is from 80 to 85° C., or alternately from 78 to 82° C. The ratio of hydrogen to propylene ratio used in the polymerization is 0.005 to 0.25, preferably from 0.10 to 0.25. The melting point of the propylene polymer resulting from the currently claimed process is high enough so that there is no sticking or agglomeration of the polymer within the reactor during polymerization. Preferably, the melting point of the propylene polymer is at least 30° C. above the reactor temperature.

The VOC levels discussed in this patent are measured before the addition of any solid or liquid product additives. Solid product additives may be metered to the system as individual neat feeds, each with its own separate gravimetric feeder, as a masterbatch (multiple additives mixed with molten resin and pelletized), as a preblend (multiple neat additives mixed together and delivered in a pill format), or as an additive/mastermix blend. The mastermix blend consists of granular resin taken from the main resin stream post purging which is optionally cooled to below reaction temperature and mixed with multiple (typically three to eight) neat solid additives. This homogenous solid resin/additive mixture is then sent to one gravimetric feeder for addition to the main resin stream prior to pelleting. The rate of addition of the mastermix is based on the main resin feed flow to the pelleting system and a calculated let-down ratio. Liquid additives are preferentially added to the resin mixer (extruder) feed hopper. An example of a liquid additive is peroxide used for cracking (visbreaking) the polymer. The liquid peroxide is fed through a small bore stainless steel tube at a predetermined ratio with the resin feed to result in the desired level of cracking. The small bore stainless steel tube is protected by a support tube which allows the liquid peroxide to be introduced into the main resin feedstream several inches from the feed hopper wall. Cracking releases byproduct hydrocarbon gases which can be removed through a vent system in the resin extruder (operating under vacuum or at flare header pressure). The pelletized product can be batch or continuously purged in downstream equipment to further lower VOC's.

Typically in a commercial process, following reactor production the polymer powder is routed to a purge bin where the monomer from the reactors is purged with nitrogen. Subsequently, solid additives can typically be added to the polymer powder, either neat or as a mastermix of all additives in a mixer or extruder. Liquid additives or liquid visbreaking agents, such as organic peroxides, can be added to the polymer at the feed throat of the extruder. Peroxides can contribute to VOC in visbroken pellet grades since they function by reducing the molecular weights of the polymer.

Attempts to reduce VOC resulting from peroxide treatment can include known methods such as extruder venting, post-pelletizing hot air, etc. The subject matter of the present specification is directed to reducing VOC in the reactor-made material, i.e., upstream of the addition of additives or visbreaking chemicals. It has unexpectedly been discovered that polymerization to produce propylene copolymers in these high temperature ranges produces low VOC propylene copolymers. As discussed above, the production of the VOC materials is a complex function of catalyst type, monomer and reactor conditions. It has unexpectedly been found that the process of the present subject matter allows production of propylene random copolymers having a low level of component and total VOC at elevated reactor temperatures while maintaining the flowability of particles and low xylene solubles and oligomers. Typically, at higher reactor temperatures, e.g., at and above 80° C., propylene polymerization selectivities can shift, resulting in increased levels of xylene solubles and oligomers contributing to VOC. However, unexpectedly in the present process, low levels of component and total VOC can be maintained in a range of elevated temperature without the expected increased production of VOC, or other product concerns, such as high xylene solubles and the occurrence of "popcorn" polymer, i.e., ruptured particles or splayed open particles associated with higher reaction temperature.

When the comonomer is ethylene, the ethylene content is from 0.5 to 7.0 wt % based on the total weight of the polymer. Preferably, the ethylene content is from 1.0 to 7.0 wt %. More preferably, the ethylene content is from 2.0 to 7.0 wt %. Even more preferably, the ethylene content is from 3.0 to 7.0 wt %. When the comonomer is $C_{4-8}$, the $C_{4-8}$ content is from 1.0 to 15.0 mol % based on the total amount of the polymer.

The melt flow rate (MFR) of the propylene polymer produced, measured according to ASTM D1238, is typically 0.2 to 400 g/10 min, where measurement of the MFR includes the addition of an antioxidant to provide stable, repeatable measurements. The antioxidant used typically includes 2000 ppm Cyanox-2246, 2000 ppm Irgafos-168 or 1000 ppm ZnO, or equivalents thereof. Preferably, the melt flow rate is from 10 to 250 g/10 min. More preferably, the melt flow rate is from 30 to 150. This melt flow rate is measured on the reactor-produced material without subsequent visbreaking.

In another embodiment, the current subject matter relates to a process comprising polymerizing propylene and an olefin comonomer selected from at least one of $C_2$ and $C_4$-$C_8$ with a Ziegler Natta catalyst system and hydrogen in a single gas-phase reactor, to form a propylene polymer. The polymerization is conducted in a temperature range of from 78 to 90° C. with a $H_2/C_3$ molar ratio of 0.005 to 025. The Ziegler Natta catalyst system comprises a solid catalyst component comprising a transition metal compound, a Group 2 metal compound, and at least one internal electron donor selected from succinates, diethers, phthalates or benzoates; an organo-aluminum compound; an activity limiting agent; and an external electron donor composition comprising at least one si lane, wherein if the olefin comonomer is ethylene it is present in the propylene polymer in an amount from 1.0-7.0 wt % based on the total weight of the propylene polymer, and if the olefin comonomer is $C_4$-$C_8$, it is present in an amount from 1.0-15.0 mol % based on the total amount of the propylene polymer. The reactor conditions and polymerization are the same as those described above.

Numerous polymerization catalysts can be used in the production of polypropylene products, including homopolymers, random copolymers, and impact copolymers. Transitions between compatible or incompatible catalysts can be accomplished without emptying the resin from the polymerization reactor utilizing a number of methods, including but not limited to: (1) allowing the activity of Catalyst A to naturally die-off and then beginning the feeding of Catalyst B; (2) killing Catalyst A with a kill agent such as a polar compound and then beginning the feeding of Catalyst B; or (3) stopping the feeding of Catalyst A and immediately beginning the feeding of Catalyst B.

The following Examples further detail and explain the process to produce propylene random copolymers having low VOC values. Those skilled in the art will recognize many variations that are within the spirit of the invention and scope of the claims.

EXAMPLES

Test Methods
Total Volatile Organic Compounds (VOC)

The Total Volatile Organic Compounds (VOC)—is measured by the static Headspace Analysis described in the textbook: Pyrolysis and GC in Polymer Analysis, edited by S. A. Liebman and E. J. Levy, Marcel Dekker, Inc., 1985. The gas chromatography/head-space gas chromatography (GC-HS) analysis is widely used in the automotive industry. The company Volkswagen AG has developed a standard, which is generally accepted and used in the plastic industry. It is known as "VW standard PV 3341" (or "PV3341"). A similar method is known as VDA-277. PV 3341 is a test in which a sample of 2 grams is placed into a headspace vial, conditioned for 5 hours at 120° C. and then injected into a GC. Quantification is accomplished using an external standard technique based on peak area response of acetone standards. The result of the test is reported as ppm carbon emissions.

Determination of the $C_7$, $C_8$, $C_9$, $C_{12}$, and $C_{15-18}$ VOC Component Contributions The measurement of VOC as a function of its constituent $C_7$, $C_8$, $C_9$, $C_{12}$, and $C_{15-18}$ components is based on ASTM 1)4526, modified as described below to correct for volatiles dissolved in the resin according to Henry's law. For the purposes of this specification, this test method will be designated as Modified ASTM D4526.

1. Sampling

Sampling the resin and sealing the sampling container is performed so as to avoid loss of residual volatiles. Teflon- or aluminum-coated septa are used to avoid absorption of volatiles into the septa. The coated side of the septum must face the vial interior. A 0.5 to 2 g resin sample, preferably close to 1 g, is taken.

2. Procedure

Operating Parameters

The resin sample is analyzed by gas chromatography using the following parameters.
  Instrument: Agilent Technologies 7890A with a capillary split inlet, two flame ionization detectors and an Agilent G1888 automatic headspace sampler or equivalent. An electronic data system is used in conjunction with the gas chromatograph.
  Detectors: Flame ionization
  Columns: (1.) OS-Gas Pro. 60 m×0.32 mm i.d.
    (2.) DB-1, 60 m×0.32 mm i.d., 5 µm film thickness. Columns are coupled to 1m×0.32 mm deactivated fused silica tubing using a glass Y-connector. Equivalent flow for each column is achieved by trimming some length from the column with the lowest flow rate (generally 1-2 meters from the DB-1).
  Temperatures:
    Injector: 200° C.
    Detector: 280° C.
    Oven: Initial temperature 40° C. (hold 2 mM);
      2° C./min up to 70° C.;
      6° C./min up to 130° C. (hold 4 mm);
      10° C./min up to 250° C. (hold 10 min)
  Carrier gas: Helium, flow rate 3.1 ml/min per column (constant flow mode)
  Detector gases:
    Hydrogen: 40 mL/minute
    Air, 450 mL/minute
    Helium or Nitrogen make-up 45 mL/minute, combined flow (i.e. column flow +make-up flow)
  Sample size: 1 milliliter (from headspace sampler)
  Inlet Split vent flow: 60 mL/minute
  Headspace
    Vial Pressurization 0.12114Pa. (18 psi)
    Oven temperature 70° C., granular
      110° C., pellets
    Loop temperature 90° C., granular
      120° C., pellets
    Transfer temperature 90° C., granular
      120° C., pellets
    Vial equilibration time 60 min, granular
      180 min, pellets
      3 min, calibration gas
      15 min, polar (liquid) calibration solution
    GC Cycle time 63 min (instrument dependent)
    Vial Pressurization time 2.0 minutes
    Loop fill time 0.2 minutes
    Loop equilibration time 0.1 minutes
    Injection time 0.1 minutes B) Calibration and Standardization Two different calibration standards are used for this method: the first is a gas standard, containing $C_1$ to $C_5$ hydrocarbons; the second is a liquid standard, containing polar analytes and hydrocarbons greater than $C_5$ that need to be measured.

Calibration is affected by different sample equilibration temperatures; two separate calibrations may be necessary where both unpelleted reactor powder and pelleted samples are routinely analyzed.

1) Calibration of Light Hydrocarbons (Gas Standard)

Calibration is performed using a certified gas standard that contains between 50 to 100 parts per million volume (ppmv) of methane, ethane, ethylene, propane, propylene, n-butane, isobutane, 1-butene, cis-2-butene, trans-2-butene, isobutene, and isopentane in a nitrogen matrix.

A headspace vial is filled with calibration gas by capping an empty vial and using two narrow bore needles (one supplying gas from the calibration cylinder and the other providing a vent flow). Connecting the vent needle to a flow meter is useful for measuring flow. At least 10 vial volumes of the calibration gas is purged through the headspace vial. The calibration gas flow is stopped and its needle removed from the vial first; then the vent needle is removed after allowing enough time (a few seconds) for the vial to equilibrate to atmospheric pressure. The room temperature and barometric pressure is recorded when the calibration vial is filled. The calibration vial is analyzed using the headspace and GC parameters above (headspace equilibration time is shortened to 3 minutes).

Calibration vials should be prepared one at a time and analyzed immediately after filling to prevent analytes partitioning into the silicone portion of the septa.

If the reference concentrations of the components in the calibration gas are reported as mole or volume ppm (ppmv), these concentrations must be converted to µg/L. Use equation [1] for this conversion.

$$C_M = (MW * P * C_V)/(0.08205 * T) \quad [1]$$

where:
$C_M$=concentration of component in µg/L
$C_V$=concentration of component in ppmv
MW=molecular weight of volatile component, g/mol
P=room barometric pressure in atm.
0.08205 L atm/K mol, ideal gas constant
T=room temperature in K (T[Kelvin]=273.15 T[Celsius])

2) Calibration of Heavier Hydrocarbons and Polar Compounds (Liquid Standard)

A liquid calibration standard is prepared containing about 1% by weight methanol, ethanol, acetone, tert-butyl alcohol, methyl acetate, isobutylene oxide isobutylaldehyde, 2-butanone (methyl ethyl ketone; MEK), ethyl acetate, isobutyl alcohol, tert-butyl ethyl ether, tert-amyl alcohol, n-pentane, isopentane, 2-methylpentane, 1-hexene, n-hexane in chlorobenzene, tetradecane, or another suitable solvent. Saturated straight chain hydrocarbons ($C_7$-C9) may also be included in this standard and used to delineate the summed peak regions for the DB-1 column. Unsaturated and branched hydrocarbons elute before the saturated straight chain hydrocarbons. All of the analytes listed above may not necessarily need to be included in this calibration solution. Different residual analytes may be present according to particular manufacturing agents used to produce the final polymer products. When the sample is a pellet where organic peroxide was used for visbreaking, key peroxide decomposition products include acetone and tea-butyl alcohol and methyl acetate, ethyl acetate, and MEK.

A microsyringe is used to transfer 5 to 9 µL of the standard into a headspace vial and cap it immediately. Calculate gas phase concentration in µg/L using equation 2.

$$C_M = V_C * d_s * C_C / V_V \quad [2]$$

where:
$V_C$=volume of calibration standard added to vial, µL
$C_C$=component's concentration in liquid calibration standard, µg/g
$V_V$=headspace vial volume, mL (typically 21.4 mL but varies with supplier)
$d_s$=density of solvent used to prepare polar standard (g/mL)

An external standard calibration method using the µ/L concentrations of the components of the calibration gas and the liquid standard is used to calculate the response factors.

$$R = C_M / A \quad [3]$$

where:
R=response factor of component
$C_M$=concentration of component in calibration gas, µg/L
A=area of peak for component The response factor calculated for n-hexane on the DB-1 column can be applied to the summed $C_7$'s, $C_8$'s, $C_9$'s $C_{12}$'s and $C_{15\text{-}18}$ hydrocarbon regions. On the Gas Pro column the response factor for n-pentane is used for the "Other $C_5$'s summed peak region, 1-hexene for the "Other $C_6$'S A", and the response factor for n-hexane is used for the "Other $C_6$'s B". The response factor for 2-methylpentane is applied to the methylpentanes peak on the Gas Pro column (where 2-methylpentane and 3-methylpentane co-elute and are summed together).

C) Procedure

The contents of the headspace vial is analyzed using the GC and headspace parameters above. After analysis, the weight of resin sample is obtained by weighing, emptying and reweighing the sample vial. Components of interest are identified by retention time.

3. Calculation

A) Calculation of Concentrations

An external data analysis method is used on the chromatographic data system to determine peak area. The concentrations of the components in the vial headspace are calculated from the external standard response factors.

$$C_G = R * A \quad [4]$$

where $C_G$=concentration of component in the headspace, µg/L

The distribution equation [5] is used to calculate the amount of each component in the solid polymer phase in the vial from its concentration in the vial's headspace (gas phase). The Distribution Constant is obtained by: measurements from spiking experiments, calculation from a known Henry's Law Constant, or estimation using the component's boiling point and the Distribution Constants and boiling points of at least two chemically similar components.

$$K_c = \{W_S/V_S\}/\{W_G/V_G\} \quad [5]$$

where:
$K_c$=Distribution constant for this volatile component
$W_S$=mass of component in the solid phase in the headspace vial, µg
$V_S$=volume of solid polymer in the vial, mL
=mass in grams of resin sample/rho
rho:=polymer density at measurement temperature, g/mL
$V_G$=volume of gas phase in the vial, mL=$V_V$-$V_S$
$W_G$=mass of the component in the gas phase in the headspace vial, µg Given the polymer density at 23° C., one can calculate the density at temperatures up to 110° C. using equation [6].

$$rho_T = rho_{23} - 0.000214*(T(° C.)-23) \quad [6]$$

The concentration of the volatile component dissolved in the resin when it was sampled into the headspace vial is calculated from equation 7.

$$C_R = 0.001 * C_G * \{V_G + K_C * V_S\}/m_R \quad [7]$$

where:
- $C_R$=concentration of component in the resin when sampled into headspace vial, μg/g
- $m_R$=mass of resin sample, g 0.001 L/mL B) Correction to Methanol Peak Area When Isobutane is Present Methanol and isobutane co-elute on the DB-1 column. When isobutane is present, its contribution to the peak area must be subtracted to obtain the peak area due to methanol. That contribution is found by calculating the ratio of isobutane's peak area to methane's peak area from the GasPro chromatogram and multiplying that ratio by the methane peak area from the DB-1 chromatogram. The corrected peak area of methanol (Equation [8]) is used in Equation [4] to calculate methanol's concentration in the headspace.

$$A_{MeOH,DB1} = A_{MEOH/iBu,DB} - A_{Methane,DB1} \times \frac{A_{iBu,GP}}{A_{Methane,GP}} \quad [8]$$

where:
- $A_{McOH,DB1}$=Corrected area for methanol peak on DB1 chromatogram
- $A_{McOH/iBu,DB1}$=Area of co-eluting methanol and isobutane peak on DB1 chromatogram
- $A_{iBu,GP}$=Area of isobutane peak on GasPro chromatogram
- $A_{Methane,DB1}$=Area of methane peak on DB1 chromatogram
- $A_{Methane,GP}$=Area of methane peak on GasPro chromatogram Polymerization The catalyst used in the polymerization reaction was a supported Ziegler-Natta solid catalyst comprising Mg, Ti and 3-methyl-5-tert butyl-1,2 phenylene dibenzoate as internal electron donor. The catalyst and its preparation are described in U.S. Pat. No. 8,536,372, which is herein incorporated by reference. As co-catalyst, triethylaluminum (TEA1) was used. As mixed external electron donor (MEED), n-propyltrimethoxy silane (NPTMS) was used as the SCA and isopropyl myristate (IPM) was used as an alkyl ester activity limiting agent. The NPTMS and IPM were fed as a mixture to the reactor. The mixture recipe contained 98 mol % IPM and 2 mol % NPTMS.

In the examples, the Ziegler Natta catalyst was fed as a slurry in white mineral oil, which is sold under the tradename HYDROBRITE 380, and injected by means of a syringe pump and a propylene carrier flow of 4 pounds per hour into the side of a 14" diameter fluidized bed gas phase reactor. In the gas phase reactor, the catalyst is contacted with propylene monomer, hydrogen and ethylene comonomer in the presence of TEA1, NPTMS and IPM to produce a propylene-ethylene random copolymer containing 4.0 wt % ethylene and having a targeted nominal melt flow rate of 70 g/10 min, Separate polymerization runs were conducted at reactor temperatures of 60, 70, 80, and 90° C. The polymer powder produced by the reactor containing active catalyst is kept in the reactor on average for a residence time of two hours. The reactor gas is removed from the top of the reactor, driven by means of a compressor, is passed through a cooler, and then is directed back into bottom of the reactor through a gas distributor plate. The gas flow emerging from the distributor plate is sufficient to fluidize the powder in the reactor and to provide sufficient cooling to the powder containing polymerizing catalyst to maintain a steady average reactor temperature. Specific reactor conditions are given in Table 1 below. Catalyst productivity was determined from the Ti residuals measurement in the product via XRF, the Ti loading of the catalyst, and catalyst feed rate. The production rate was defined as the weight of product discharge by the reactor during a 3 hour period divided by 3.

Figure 1:
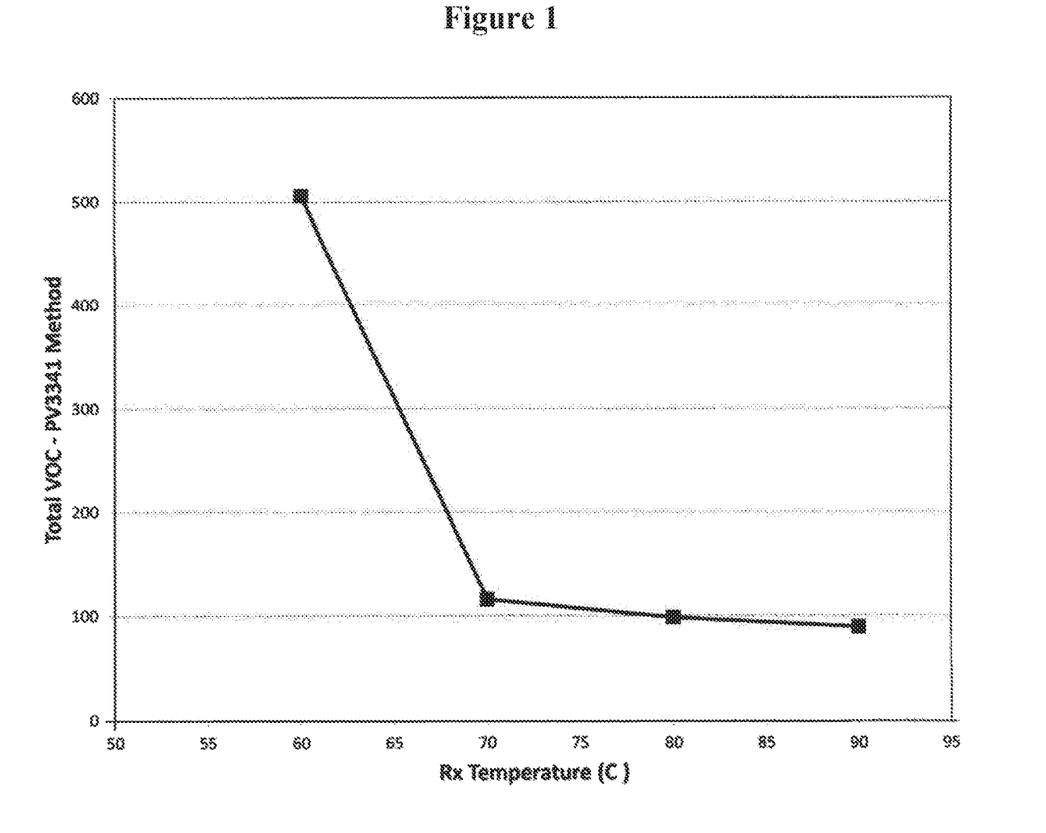
FIG. 1 illustrates a line graph of the total VOC versus reactor temperature.
Figure 2:
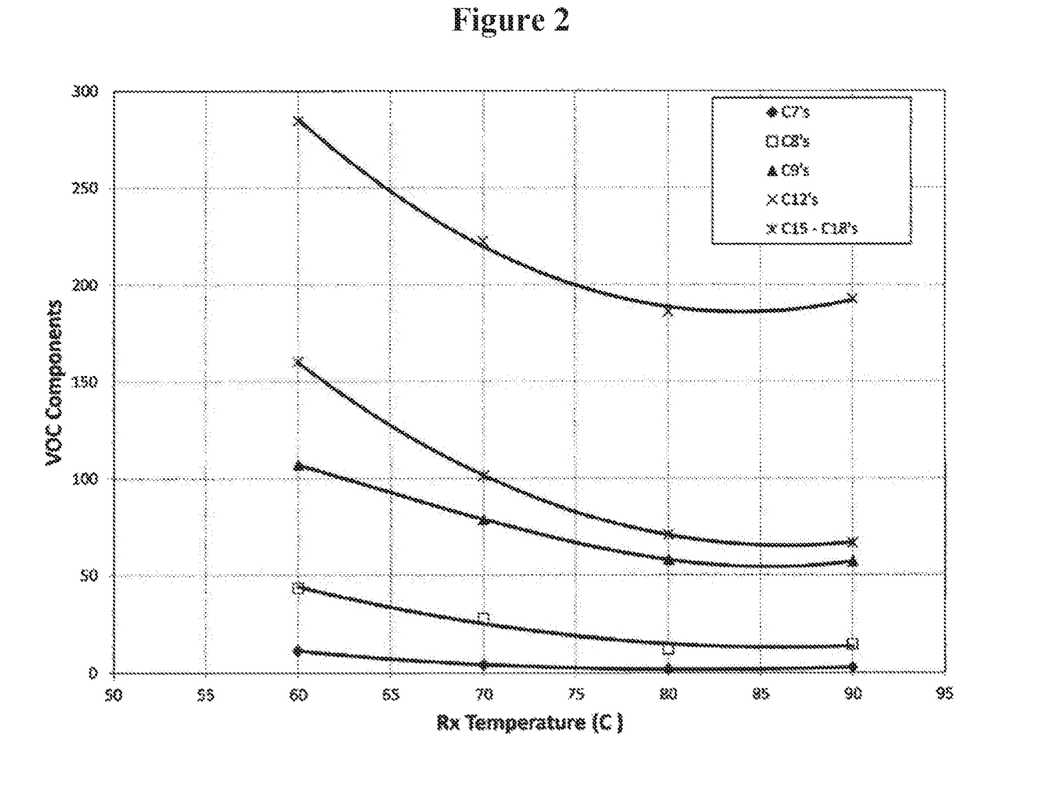
FIG. 2 illustrates a line graph of the VOC level versus reactor temperature for IOC components $C_7$ to $C_{15-18}$.
Figure 3:
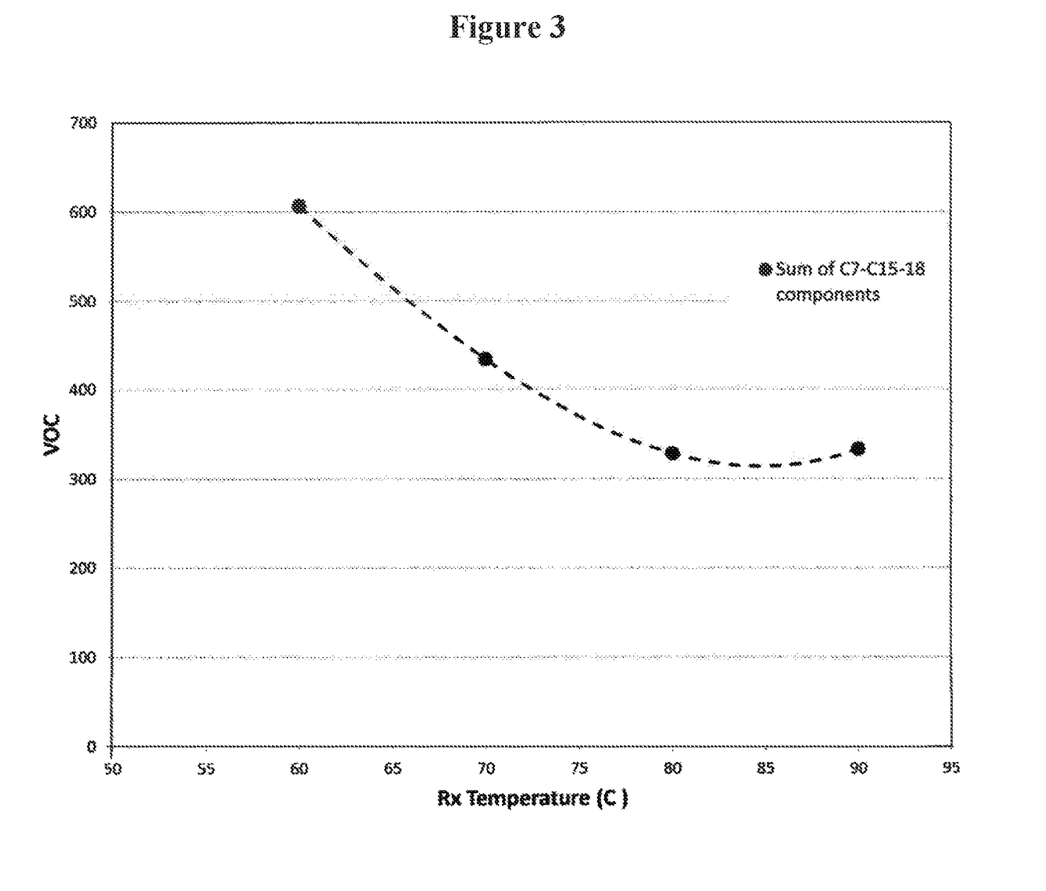
FIG. 3 illustrates a line graph of the VOC; level versus reactor temperature for the sum of VOC components $C_7$ to $C_{15-18}$.

Headspace samples of the product were collected from the reactor after monomer was purged from the polymer with nitrogen at room temperature for 3 hours. Total VOC levels and VOC component levels were measured as described below. The VOC properties of the polymerization runs are summarized in Tables 2 and 3 and FIGS. 1 to 3. FIG. 1 illustrates a line graph of the total VOC versus reactor temperature. FIG. 2 illustrates a line graph of VOC level versus reactor temperature for VOC components $C_7$ to $C_{15-18}$. In Table 3 and FIG. 2, the component VOC's demonstrate that significant reductions from the 60° C. are achieved at the higher reactor temperatures, and only low increases above the minimum are demonstrated for $C_7$, $C_8$, and $C_{12}$ VOC at the highest reactor temperature (90° C.). FIG. 3 illustrates a line graph of VOC level versus reactor temperature for VOC for the sum of VOC components $C_7$ to $C_{15-18}$.

TABLE 1

Preparation of the polypropylene examples

| Reactor Conditions | | 1 | 2 | 3 | 4 |
|---|---|---|---|---|---|
| Catalyst Feed Rate | [cc/hr] | 1.0 | 1.0 | 0.9 | 1.2 |
| Catalyst Slurry Solids | [wt %] | 26.8 | 26.8 | 26.8 | 26.8 |
| Catalyst Ti Loading | [wt %] | 4.0 | 4.0 | 4.0 | 4.0 |
| Reactor Temperature | [° C.] | 60 | 70 | 80 | 90 |
| Total Pressure | [psi] | 422 | 421 | 421 | 421 |
| $C_3$ Partial Pressure | [psi] | 321 | 320 | 320 | 320 |
| Bed Weight | [lb] | 65.9 | 67.2 | 69.2 | 74.9 |
| Superficial Gas Velocity | [ft/s] | 1.19 | 1.20 | 1.19 | 1.21 |
| $H_2/C_3$ | [mol/mol] | 0.090 | 0.080 | 0.063 | 0.052 |
| $C_2/C_3$ | [mol/mol] | 0.027 | 0.026 | 0.024 | 0.022 |
| TEAl Feed Rate | [cc/hr] | 84.5 | 84.5 | 76.0 | 101.2 |
| TEAl/Ti Feed Ratio | [mol/mol] | 54 | 54 | 50 | 47 |
| TEAl/MEED Feed Ratio | [mol/mol] | 2.6 | 3.3 | 3.5 | 3.2 |
| MEED Feed Rate | [cc/hr] | 103.4 | 82.7 | 64.7 | 87.4 |
| Production Rate | [lb/hr] | 31 | 34 | 30 | 33 |

Table 2 lists the Total VOC C-ppm, measured via the PV3341 method, for examples 1-4.

TABLE 2

Total VOC, C-ppm

| Example | Reactor Temperature, ° C. | Total VOC, C-ppm | Percent Reduction from 60° C. |
|---|---|---|---|
| 1 | 60 | 506 | — |
| 2 | 70 | 116 | 77.1 |
| 3 | 80 | 98 | 80.6 |
| 4 | 90 | 89 | 82.4 |

The table demonstrates that relative to a 60° C. threshold level, the process of the current subject matter preferably results in a reduction in Total VOC, C-ppm measured by Test Method PV3341, more preferably, of 70 to 85%, and even more preferably, at least 75%, preferably of at least 80%. The table illustrates the low level of VOC that are achievable with the process of the current subject matter.

Table 2 lists the reduction of VOC components in Examples 1-4, measured via the Modified ASTM D4526 method.

TABLE 3

VOC Components[1]

| Example | Rx. Temp., ° C. | $C_7$ | $C_8$ | $C_9$ | $C_{12}$ | $C_{15-18}$ | Total $C_{7-15/18}$ | Percent Reduction from 60° C. |
|---|---|---|---|---|---|---|---|---|
| 1 | 60 | 11.4 | 43.2 | 107 | 284 | 160 | 606 | |
| 2 | 70 | 4.1 | 27.6 | 79 | 222 | 101 | 434 | 28.3 |
| 3 | 80 | 1.6 | 12.0 | 58 | 186 | 71 | 328 | 45.8 |
| 4 | 90 | 2.6 | 14.4 | 57 | 193 | 67 | 334 | 44.8 |

It should be noted that the difference in total VOC between Table 2 and Table 3 results from the differences in calibration of the analysis method used.

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

We claim:

1. A process comprising:
polymerizing propylene and at least one olefin comonomer selected from $C_2$ and $C_4$-$C_8$ with a Ziegler Natta catalyst system and hydrogen in a single gas-phase reactor, to form a propylene polymer,
the polymerization being conducted in a temperature range of from 78 to 90° C. with a $H_2/C_3$ molar ratio of 0.005 to 0.25,
the Ziegler Natta catalyst system comprising:
a solid catalyst component comprising a transition metal compound, a Group 2 metal compound and at least one internal electron donor comprising a substituted phenylene aromatic diester;
an activity limiting agent;
an organo-aluminum compound; and
an external electron donor composition comprising at least one silane, wherein if the olefin comonomer is ethylene it is present in the propylene polymer in an amount from 0.5-7.0 wt % based on the total weight of the propylene polymer, and if the olefin comonomer is $C_4$-$C_8$, it is present in an amount from 1.0-15.0 mol % based on the total amount of the propylene polymer.

2. The process of claim 1 wherein the propylene polymer has a melt flow rate of 0.2 to 400 g/10 min as determined according to ASTM D1238.

3. The process of claim 1 wherein the melt flow rate is 30.0 to 150 g/10 min as determined according to ASTM D1238.

4. The process of claim 1 wherein the polymerization temperature is from 78 to 82° C.

5. The process of claim 1 wherein the internal electron donor is a single internal electron donor selected from substituted phenylene aromatic diesters.

6. The process of claim 5 wherein the substituted phenylene aromatic diesters are selected from 1,2-phenylene aromatic diesters with the structure:

wherein:
$R_1$-$R_4$ are individually selected from the group consisting of a hydrogen, substituted hydrocarbyl group having 1 to 20 carbon atoms, an unsubstituted hydrocarbyl group having 1 to 20 carbon atoms, an alkoxy group having 1 to 20 carbon atoms, a heteroatom and combinations thereof;
at least one of $R_1$-$R_4$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof; or any consecutive R groups in $R_1$-$R_4$ may be linked to form cyclic structure; and
each of $R_5$-$R_{14}$ is selected from the group consisting of a hydrogen, substituted hydrocarbyl group having 1 to 20 carbon atoms, an unsubstituted hydrocarbyl group having 1 to 20 carbon atoms, an alkoxy group having 1 to 20 carbon atoms, a heteroatom and combinations thereof; or any consecutive R groups in $R_5$-$R_{14}$ may be linked to form cyclic structure.

7. The process of claim 6 wherein each of the $R_5$-$R_{14}$ is hydrogen.

8. The process of claim 6 wherein at least one of $R_5$-$R_{14}$ is selected from the group consisting of a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof.

9. The process of claim 6 wherein at least one of $R_1$-$R_4$, at least one of $R_5$-$R_9$, and at least one of $R_{10}$-$R_{14}$ is an unsubstituted hydrocarbyl group having 1 to 20 carbon atoms.

10. The process of claim 6 wherein each of $R_1$, $R_3$ and $R_4$ is hydrogen and $R_2$ is an unsubstituted hydrocarbyl group having 1 to 20 carbon atoms.

11. The process of claim 10 wherein each of $R_5$-$R_{14}$ is selected from the group consisting of hydrogen, a substituted hydrocarbyl group having 1 to 20 carbon atoms, an unsubstituted hydrocarbyl group having 1 to 20 carbon atoms, an alkoxy group having 1 to 20 carbon atoms, a halogen, and combinations thereof.

12. The process of claim 6 wherein each of $R_2$, $R_3$ and $R_4$ is hydrogen and $R_1$ is an unsubstituted hydrocarbyl group having 1 to 20 carbon atoms.

13. The process of claim 12 wherein at least one of $R_5$-$R_{14}$ is selected from the group consisting of hydrogen, a substituted hydrocarbyl group having 1 to 20 carbon atoms, an unsubstituted hydrocarbyl group having 1 to 20 carbon atoms, an alkoxy group having 1 to 20 carbon atoms, a halogen, and combinations thereof.

14. The process of claim 6 wherein $R_1$ is a methyl group and each of $R_5$-$R_{14}$ is hydrogen.

15. The process of claim 6 wherein the cyclic structure is a $C_5$ or a $C_6$ membered ring.

16. The process of claim 5 wherein the substituted 1,2-phenylene aromatic diester is selected from the group consisting of 3-methyl-5-tert-butyl-1,2-phenylene dibenzoate; 3,5-diisopropyl-1,2-phenylene dibenzoate; 3,6-dimethyl-1,2-phenylene dibenzoate; 4-t-butyl-1,2-phenylene dibenzoate; 4-methyl,2-phenylene dibenzoate; 1,2-naphthalene dibenzoate; 2,3-naphthalene dibenzoate; 3-methyl-t-tert-butyl-1,2-phenylene di (4-methylbenzoate); 3-methyl-5-tert-butyl-1,2-phenylene di (2,4,6-trimethylbenzoate); 3-methyl-5-tert-butyl-1,2-phenylene di (4-fluoro benzoate); and 3-methyl-5-tert-butyl-1,2-phenylene di(4-chlorobenzoate).

17. The process of claim 1 wherein the propylene polymer has a total VOC content as measured by PV-3341 of less than 200 ppm.

18. The process of claim 17 wherein the total VOC content is less than 100 ppm.

19. The process of claim 1 wherein the propylene polymer has a $C_9$ VOC content, as measured by Modified ASTM D4526 of less than 100 ppm.

20. The process of claim 19 wherein the $C_9$ VOC content is less than 65 ppm.

21. The process of claim 1 wherein the propylene polymer is a propylene random copolymer with ethylene.

22. The process of claim 1 wherein the propylene polymer is a propylene random copolymer with $C_4$-$C_8$.

23. A process comprising:
polymerizing propylene and at least one olefin comonomer selected from $C_2$ and $C_4$-$C_8$ with a Ziegler Natta catalyst system and hydrogen in a single gas-phase reactor, to form a propylene polymer,
the polymerization being conducted in a temperature range of from 78 to 90° C. with a $H_2/C_3$ molar ratio of 0.005 to 0.25,
the Ziegler Natta catalyst system comprising:
a solid catalyst component comprising a transition metal compound, a Group 2 metal compound, and at least one internal electron donor selected from succinates, diethers, phthalates or benzoates;
an activity limiting agent;
an organo-aluminum compound; and
an external electron donor composition comprising at least one silane, wherein if the olefin comonomer is ethylene it is present in the propylene polymer in an amount from 1.0-7.0 wt % based on the total weight of the propylene polymer, and if the olefin comonomer is $C_4$-$C_8$, it is present in an amount from 1.0-15.0 mol % based on the total amount of the propylene polymer.

24. A process comprising:
polymerizing propylene and at least one olefin comonomer selected from C2 and C4-C8 with a Ziegler Natta catalyst system and hydrogen in a single gas-phase reactor, to form a propylene polymer,
the polymerization being conducted in a temperature range of from 78 to 90° C. with a $H_2/C_3$ molar ratio of 0.005 to 0.25,
the Ziegler Natta catalyst system comprising:
a solid catalyst component comprising a transition metal compound, a Group 2 metal compound and at least one internal electron donor comprising a compound of structure:

an activity limiting agent;
an organo-aluminum compound; and
an external electron donor composition comprising at least one silane, wherein if the olefin comonomer is ethylene it is present in the propylene polymer in an amount from 0.5-7.0 wt % based on the total weight of the propylene polymer, and if the olefin comonomer is $C_4$-$C_8$, it is present in an amount from 1.0-15.0 mol % based on the total amount of the propylene polymer;
wherein:
the propylene polymer has a melt flow rate of 0.2 to 400 g/10 min as determined according to ASTM D1238;
$R_1$-$R_4$ are individually selected from the group consisting of a hydrogen, substituted hydrocarbyl group having 1 to 20 carbon atoms, an unsubstituted hydrocarbyl group having 1 to 20 carbon atoms, an alkoxy group having 1 to 20 carbon atoms, a heteroatom and combinations thereof; and at least one of $R_1$-$R_4$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof; or any consecutive R groups in $R_1$-$R_4$ may be linked to form a cyclic structure;
each of $R_5$-$R_{14}$ is hydrogen; and
the propylene polymer has a total VOC content as measured by PV-3341 of less than 100 ppm.

* * * * *